(12) United States Patent
Boileau et al.

(10) Patent No.: US 11,141,019 B2
(45) Date of Patent: Oct. 12, 2021

(54) MACHINE AND METHOD FOR PREPARING A BEVERAGE

(71) Applicant: NESTEC S.A., Vevey (CH)

(72) Inventors: Vincent Boileau, Corcelles (CH); Vincent Rognon, Orbe (CH); Yann Epars, La Conversion (CH)

(73) Assignee: Societe des Produits Nestle S.A., Vevey (CH)

( * ) Notice: Subject to any disclaimer, the term of this patent is extended or adjusted under 35 U.S.C. 154(b) by 254 days.

(21) Appl. No.: 16/097,313

(22) PCT Filed: Apr. 26, 2017

(86) PCT No.: PCT/EP2017/059973
§ 371 (c)(1),
(2) Date: Oct. 29, 2018

(87) PCT Pub. No.: WO2017/191018
PCT Pub. Date: Nov. 9, 2017

(65) Prior Publication Data
US 2019/0133366 A1    May 9, 2019

(30) Foreign Application Priority Data
May 4, 2016  (EP) .................................. 16168248

(51) Int. Cl.
*A47J 31/36*  (2006.01)
*A47J 31/40*  (2006.01)
*A47J 31/52*  (2006.01)

(52) U.S. Cl.
CPC ......... *A47J 31/3623* (2013.01); *A47J 31/407* (2013.01); *A47J 31/5251* (2018.08)

(58) Field of Classification Search
CPC ... A47J 31/3623; A47J 31/5251; A47J 31/407
See application file for complete search history.

(56) References Cited

U.S. PATENT DOCUMENTS

| 8,733,229 B2 * | 5/2014 | Jarisch ................ A47J 31/3633 99/289 R |
| 2012/0251677 A1 * | 10/2012 | Yoakim .............. B65D 85/8043 426/112 |

FOREIGN PATENT DOCUMENTS

| WO | 2013042041 | 3/2013 |
| WO | 2016005417 | 1/2016 |
| WO | 2016055232 | 4/2016 |
| WO | 2016055633 | 4/2016 |

* cited by examiner

*Primary Examiner* — Anthony J Weier
(74) *Attorney, Agent, or Firm* — K&L Gates LLP

(57) ABSTRACT

An beverage-preparation apparatus includes a capsule receptacle (204, 300, 400, 416, 500) receiving a beverage capsule (306, 418) containing a quantity of a beverage ingredient, and an injection head (202) for injecting fluid into said beverage capsule (306, 418) to produce a beverage, said injection head (202) being mobile between a first, inactive position and a second, active position, and further having a biasing device (226, 304) selectively preventing the injection head (202) from remaining in the first, inactive position, and a capsule-detecting means (308, 402, 404, 422, 508) activating the biasing device (226, 304) when the presence of a beverage capsule (306, 418) within said capsule receptacle (204, 300, 400, 416, 500) is detected.

14 Claims, 4 Drawing Sheets

MACHINE AND METHOD FOR PREPARING A BEVERAGE

CROSS REFERENCE TO RELATED APPLICATIONS

The present application is a National Stage of International Application No. PCT/EP2017/059973, filed on Apr. 26, 2017, which claims priority to European Patent Application No. 16168248.9, filed on May 4, 2016, the entire contents of which are being incorporated herein by reference.

FIELD OF THE INVENTION

The present invention concerns a machine for the preparation of beverages, as well as a method for the utilization of such a machine.

BACKGROUND OF THE INVENTION

Single-serving beverage preparation machines are well known in the food industry and consumer goods domain. Such machines allow a consumer to prepare on command a single serving of a beverage such as drip coffee, espresso coffee, tea, hot chocolate drink, or even liquid foodstuffs such as soup or infant formula.

Most beverage preparation machines for in-home use operate according to a system in which beverage ingredients are provided in single-serving portions in individual containers, in particular in the form of a rigid or semi-rigid capsule. Such capsules are ordinarily hermetically sealed, so as to maintain the freshness and quality of the beverage ingredient within the capsule until use.

To prepare a serving of a beverage, the capsule is first inserted into a beverage preparation machine ("beverage preparation machine") adapted to receive it. The beverage preparation machine comprises a means for heating a volume of water and conducting it into the beverage capsule, wherein the heated water combines with the beverage ingredient to make a beverage.

The means of the beverage preparation machine which are adapted to receive the beverage capsule may take various forms, but in general will contain a receptacle adapted to the form of the capsule in question; and an injection unit which comprises an injection needle and is positioned upon the beverage capsule.

The water may be injected at an elevated pressure (for e.g. espresso coffee capsules), or simply channelled into the capsule at atmospheric pressure (for e.g. drip coffee). Where the capsule is provided in a hermetically-sealed form, the beverage preparation machine may advantageously be provided with a hollow injection needle, which is used to both break the hermetic seal of the capsule and to inject the heated water to produce the beverage.

Once prepared, the beverage is dispensed from the capsule into a waiting container for consumption. To maintain the hermetic seal of the capsule, the outlet of the capsule is maintained in a sealed state until the beverage preparation process is begun, at which point the seal is broken and the outlet opened to allow the beverage to flow from the capsule. This is advantageously accomplished by constructing the beverage capsule of a frangible material, and/or providing a frangible membrane on a surface of the beverage capsule adapted to be pierced by the injection needle.

The beverages produced by such beverage capsules are thereby of a uniformly high quality and consistency.

However, such apparatuses are disadvantageous in that after the beverage-preparation process is complete there may still remain some residual beverage liquid in the beverage capsule and/or in the capsule receptacle.

Moreover, the user often will not remove the beverage capsule immediately after the preparation of a beverage. This may result in an unclean condition in the beverage receptacle and possibly leading to the deposition of residues, notably within the capsule receptacle and in the space in and around the injection needle.

This condition may be particularly acute where the beverage capsule contains milk, sugar, or other highly-perishable beverage ingredients, which tend to favour the growth of undesirable microorganisms. This condition may also be aggravated where the beverage preparation machine is left inactive for a period of time without first removing the spent beverage capsule.

In certain beverage preparation machines, it is known to provide a means for automatically ejecting the beverage capsule at the completion of the beverage preparation, such as a motor-driven mechanism disposed in the capsule receptacle. However, such mechanisms are not ideal, in that they add a considerable amount of cost and complexity to the beverage preparation machine, and reduce reliability and service life as a result.

There is thus a need to provide a beverage preparation machine which resolves the above-related difficulties.

SUMMARY OF THE INVENTION

To this end, the invention is in a first aspect directed towards an apparatus for preparing beverages, comprising a capsule receptacle adapted to receive a beverage capsule containing a quantity of a beverage ingredient and an injection head adapted to inject a volume of fluid into said beverage capsule, said injection head being mobile between a first, inactive position and a second, active position.

According to the invention, the apparatus further comprises a biasing device configured to selectively prevent the injection head from remaining in the first, inactive position, and a capsule-detecting means adapted to activate said biasing device when said capsule-detecting means detects the presence of a beverage capsule within said capsule receptacle.

A beverage preparation machine so configured is advantageous in that the beverage preparation machine is thereby prevented from remaining in the first, inactive position until the spent beverage capsule is removed. In this way, the beverage preparation machine is prevented from being left in the first, inactive a position which favours the deposition of deposits and the possible growth of microorganisms therein.

In a possible embodiment, the biasing device is adapted to selectively bias the injection head into the second, active position when the capsule detecting means detects the presence of a beverage capsule, and into the first, inactive position when the capsule-detecting means detects the absence of a beverage capsule.

This is advantageous in that the beverage preparation machine is capable of actively placing itself either of the first and second positions, rather than simply just avoiding remaining in the second, active position. By manipulating the bias system, therefore, the position of the injection head may be manipulated, thereby giving more flexibility and capability to the operation of the apparatus.

In a preferred embodiment, the biasing device comprises a resilient element being operably connected to the injection head at an attachment point, said attachment point being mobile between a first attachment position wherein the force exerted by the mass of the injection head is greater than the force exerted by the resilient element, thereby biasing said injection head into the first, inactive position; and a second attachment position wherein the force exerted by the resilient element is greater than the force exerted by the mass of said injection head, thereby biasing the injection head into the second, active position.

In this way, the biasing effect is achieved in a manner that permits changing the bias from one position to the other simply by displacing the attachment point. Such a displacement may be accomplished by a relatively simple mechanical linkage, simplifying the design of the beverage preparation machine. Moreover, since the mass of the injection head is always at least partially offset by the force exerted by the resilient element, the injection head may be manipulated and/or displaced by the user with a minimum of effort.

In a possible embodiment, the resilient element is an elastic polymer linkage, a metallic spring, or a gas strut.

Each of these configurations of the resilient element is advantageous in some way. First, an elastic polymer linkage may be moulded or shaped into a variety of forms, increasing the versatility and range of design possible in the beverage preparation machine. A gas strut may be configured with a built-in damping effect, yielding a smoother motion in the displacement of the injection head. And the mechanical spring may be produced economically in large quantities. In this way, the configuration of the apparatus may be made to conform to the desired market positioning thereof.

In a possible embodiment, the biasing device comprises an interlock preventing the disposition of the injection head into the first, inactive position.

This is advantageous in that, by engaging the biasing device, the beverage preparation machine is not only prevented from remaining in the first, inactive position, but cannot be disposed in that position in the first place. In this way, the user is given a strong induction to remove the spent beverage capsule, thereby promoting the cleanliness of the beverage preparation machine.

Preferably, the interlock is a blocking pin, said blocking pin being mobile between a first, retracted position and a second, extended position wherein said blocking pin bears against a complementary surface of said apparatus, thereby preventing the disposition of the injection head into the first, inactive position.

Such an interlock is advantageous in that it is easily and inexpensively furnished, and can be configured to be both reliable and durable in a wide array of applications.

Most preferably, the blocking pin is disposed at least partially within the capsule receptacle when disposed in the first, retracted position, such that the insertion of a beverage capsule into said capsule receptacle moves the blocking pin into the second, extended position.

This is advantageous in that, since it is the physical contact between the beverage capsule and the blocking pin that displaces the latter into the second, extended position, the blocking pin serves as both interlock and capsule-detecting means. In this way, the advantages of the invention are realised in a manner that is simple and inexpensive to implement.

In another possible embodiment, the capsule-detecting means is an electrical or electro-mechanical sensor.

More particularly, the capsule-detecting means is a magnetic, optical, proximity, or radio-frequency sensor.

Alternatively, the capsule-detecting means is a pressure sensor disposed in the capsule receptacle or injection head.

Such configurations for the capsule-detecting means are advantageous in that, being electrical or electro-mechanical devices, they are easily integrated into the other control systems that may be present in the beverage preparation machine. Moreover, the capsule-detecting means may be chosen to serve other functions besides simply indicating the presence of a capsule, such as identifying its contents or the integrity of its hermetic seal. In this way, the capabilities of the beverage preparation machine are further extended.

According to a second aspect, the invention is directed towards a method for using a beverage preparation machine according to the above description, comprising the steps of detecting the presence of a beverage capsule in the capsule receptacle, said beverage capsule containing a quantity of a beverage ingredient; activating a biasing device to prevent the injection head from remaining in the first, inactive position; injecting a volume of water into said beverage capsule to produce a beverage; detecting the absence of said beverage capsule in said capsule receptacle; and deactivating said biasing device.

This method is advantageous in that it puts into action the advantages of the apparatus, as disclosed above.

In a possible embodiment, the biasing step comprises a blocking sub-step wherein the injection head is prevented from being disposed into the first, inactive position.

Preferably, the blocking sub-step comprises engaging an interlock.

Most preferably, the first and second detecting steps are performed by a capsule-detecting means disposed in the injection head or the capsule receptacle.

In this way, the advantages of the capsule-detecting means described above are realised.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
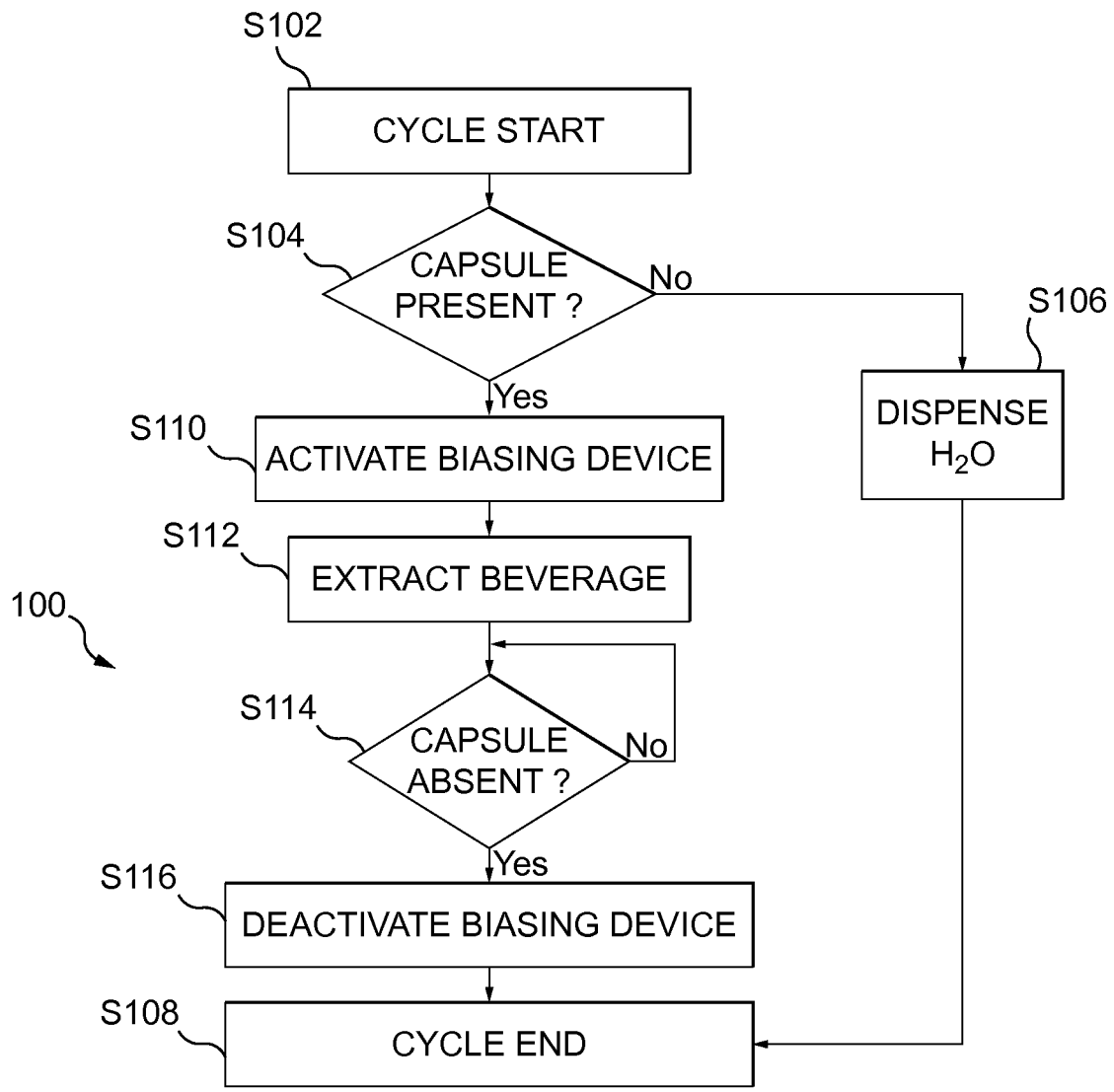
FIG. 1 is a flowchart depicting an exemplary method according to an embodiment of the invention.

The invention comprises a method for preparing a beverage, an embodiment of which is presented in FIG. 1 in the form of a method 100.

The method 100 begins with the activation of the beverage-preparation cycle in a step S102 of starting the cycle. At this point, in a step S104, a capsule-detecting means determines whether there is a beverage capsule present in a capsule receptacle of the beverage preparation machine.

If the capsule-detecting means returns a "NO" response, then the beverage dispensing apparatus will dispense a volume of heated water, in a step S106. This is useful for when the user requires a volume of heated water for e.g. reconstituting powdered soups or beverages, or steeping loose or bagged tea. Once this is completed, the cycle ends at a step S108.

If, however, the capsule-detecting means returns a "YES," indicating that a beverage capsule is present, then a number of additional steps are implicated.

First, a biasing device in the beverage preparation machine is activated, in a step S110. Subsequent to this the beverage is extracted by the injection of the fluid into the beverage capsule in a step S112.

It should be noted, however, that the biasing device may alternatively be activated during or immediately after the extraction of the beverage during the step S112. The exact timing of the execution of these two steps S110 and S112 may thus vary according to the particular implementation of the method.

The activation of the biasing device in the step S110 serves to prevent the beverage preparing machine from remaining in an inactive position, so long as the biasing device is active. This may simply be a matter of causing the beverage preparation machine to return on its own accord to a certain position; or it may involve, either additionally or alternatively, a blocking sub-step wherein the beverage preparing machine is blocked from being disposed in the first, inactive position, such as by the engagement of an interlock device in the beverage preparation machine.

In any case, when the absence of the beverage capsule is detected (i.e. when the beverage capsule is removed from the capsule receptacle) in a step S114, the biasing device will be deactivated in a step S116 before the cycle ends at step S108.

Once the biasing device is deactivated, the apparatus is free to be placed in the first, inactive position. In practical terms, this assures that the spent beverage capsule is removed from the beverage preparation machine before said beverage preparation machine is permitted to be left in a position favourable to the formation of harmful deposits and/or microorganism growth within it.

Figure 2A:
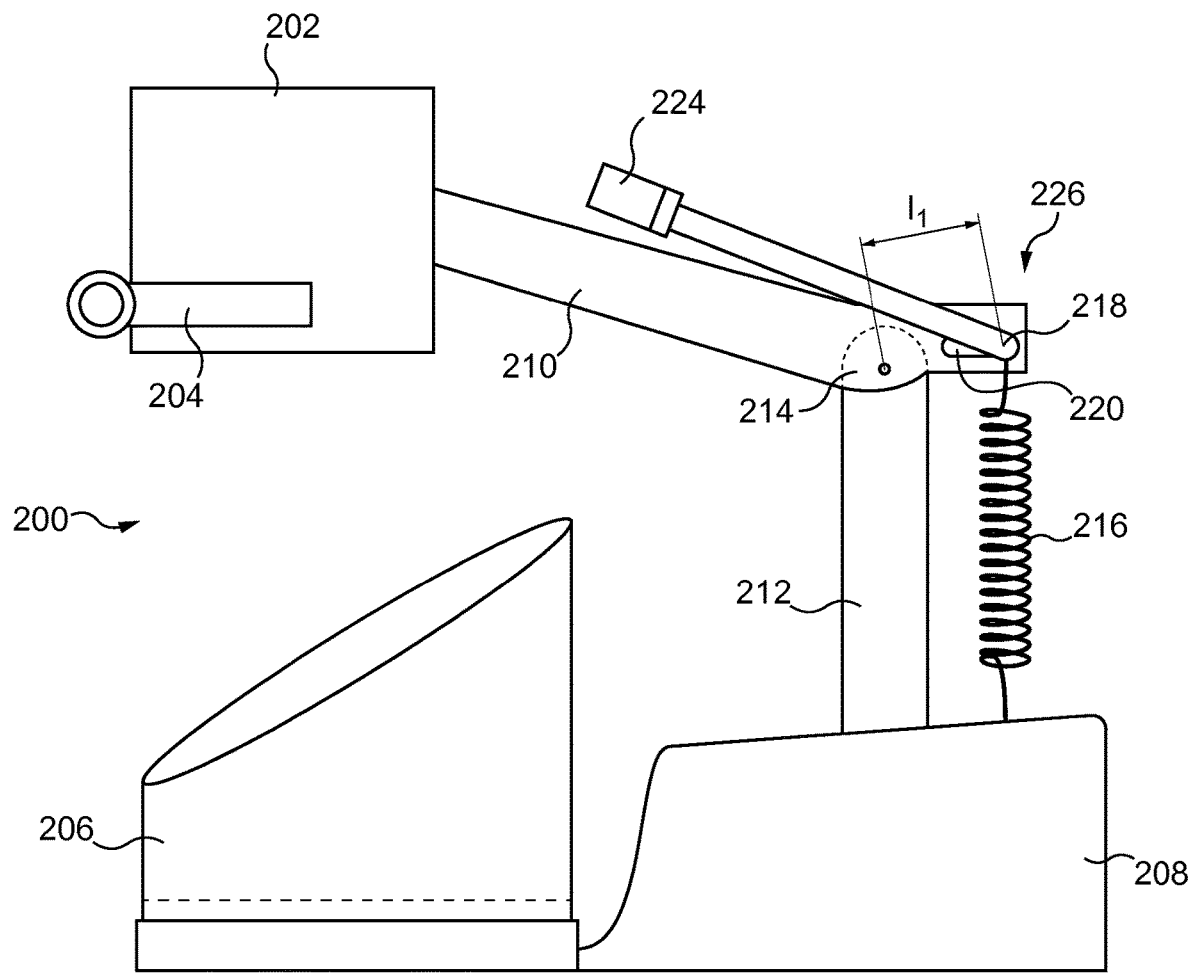
FIGS. 2A and 2B are a simplified beverage preparation machine according to a first embodiment of the invention, in a second, active position and a first, inactive position, respectively.
Figure 2B:
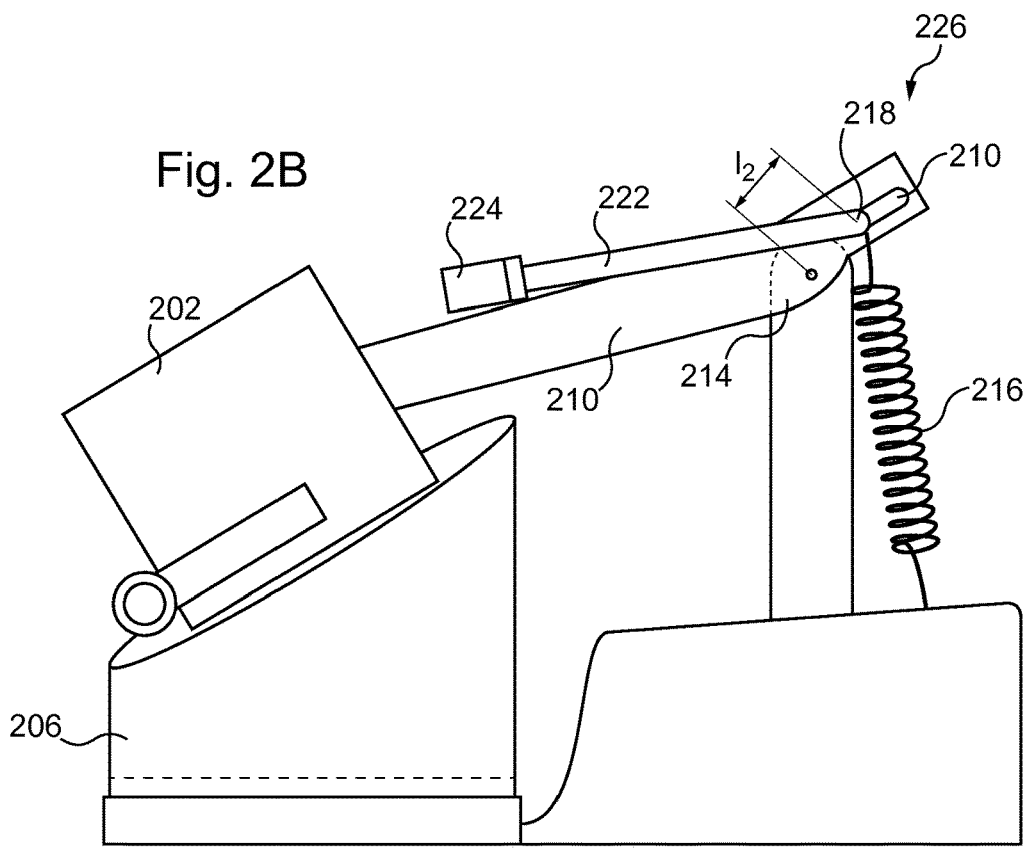

A first embodiment of the invention is depicted in FIGS. 2A and 2B, respectively in a second, active position and a first, inactive position.

A simplified beverage preparation machine 200 is depicted: the beverage preparation machine 200 comprises an injection head 202. The injection head 202 functions according to the general principles known in the art of capsule-based beverage preparation machines: a beverage capsule is inserted in a capsule receptacle (represented here by a capsule receptacle 204), and a hollow needle (not shown) disposed within the injection head.

To prepare a beverage, the hollow needle is made to pierce the beverage capsule and inject a volume of fluid therein, usually but not necessarily heated to an elevated temperature. This fluid is usually water, but in some applications steam or a steam/water mixture may be envisioned, for instance espresso coffee. The fluid mixes with a beverage ingredient in the beverage capsule to make a beverage, and is then dispensed into a receptacle such as a cup or bottle for consumption.

The beverage preparation machine 200 thus comprises a container receptacle 206, into which a cup, bottle, or other container is disposed, such that a beverage prepared by the apparatus will flow from the injection head 202 and be dispensed therein.

The beverage preparation machine 200 is further provided with a base unit 208, here shown in a simplified form. The base unit 208 may be employed to house a number of components necessary for the functioning of the apparatus 200, for instance a water tank, heater, pump, and/or control circuitry for regulating the functioning of the apparatus 200.

The injection head 202 is, in this embodiment, provided in a mobile configuration. In FIG. 1, therefore, the beverage preparation machine 200 is shown in the second, active position; FIG. 2 discussed below illustrates the apparatus 200 in a first, inactive position.

To effectuate this mobile configuration, the beverage preparation machine 200 comprises a mobile arm 210 upon which the injection head 202 is mounted, which is attached to a stationary arm 212 extending from the base unit 208 and hinged thereto at a pivot point 214. In this way, the injection head 202 is made mobile relative to the base unit 208.

However, the injection head 210 and mobile arm 210 are not freely mobile relative to the base unit 208. There is provided an elastic element 216, which exerts a tensile force on the mobile arm 210.

The elastic element 216 is here envisioned as a simple metallic tension spring. However, it will be readily understood that many other configurations of the elastic element may be envisioned, depending on the overall configuration of the beverage preparation machine and the operation thereof that is sought. For instance, the elastic element may instead be provided as a moulded polymer element, or a gas-charged strut. Other such elements may also be envisaged, and the person of skill in the art will be readily capable of determining which is most appropriate for any particular application.

Returning to FIG. 2A, it will be noted that the elastic element 216 is attached to the mobile arm 210 at an attachment point 218 which is itself mobile relative to the mobile arm 210, being able to slide within the slot 220. Thus, it will be apparent that the torque exerted by the elastic element 216 about the pivot point 214 is a function of the position of the attachment point 218 within the slot 220. In FIG. 2A, therefore, the torque exerted by the elastic element 216 on the pivot point 214 is the product of the spring force and the lever arm $l_1$.

Of course, since the attachment point 218 is mobile, it will be recognised that a means for displacing and blocking the attachment point 218 is advantageous. To that effect, the present embodiment is provided with a linkage arm 222. The linkage arm 222 is actuated by a cam 224, which operates to move the linkage arm 222 and, as a result, the attachment point 218. When the cam 224 is held in position the attachment point 218 is effectively locked into the attachment position depicted in FIG. 2A.

Thus, when the linkage arm 222 is disposed in the position depicted in FIG. 2A, the torque created by the elastic element 216 will overcome the torque generated by the mass of the injection head 202, and result in the injection head being biased into the active second position so depicted. When displaced, the injection head 202 will return to the second, active position.

The elastic element 216, attachment point 218, linkage arm 222, and cam 224 can thus be considered in the aggregate as a biasing device 226 of the beverage preparation machine 200.

Turning now to FIG. 2B, the beverage preparation machine 200 is depicted in the first, inactive position.

Notably, the cam 224 has been rotated to move the linkage arm 222 towards the injection head 202; as a result, the attachment point 218 is displaced in the slot 220 to the position shown.

As a result, the distance between the attachment point 218 and the pivot point 2147 is reduced to the length $l_2$ and, as a result, the torque generated by the weight of the injection head 202 is greater than that generated by the elastic element 216. Consequently, the bias on the injection head is reversed; where in FIG. 1 the injection head would naturally return to the second, active position, in FIG. 2 the injection head will naturally return to the first, inactive position.

In this way, the torque exerted by the elastic element 216 can be adjusted, in that by moving the attachment point 218 the length l of the lever arm is adjusted. By selecting the elastic element and the configuration of the apparatus (e.g. the location of the attachment point and its range of motion), the beverage preparation machine may be configured such that the weight of the injection head is offset, or nearly offset, by the force exerted by the elastic element. The biasing device 226 is thus capable of selectively biasing the injection head 202 into at least two positions.

The mobile attachment point 218 of the elastic element 216 thus serves as a biasing device, in that it operates to selectively bias the injection head into a certain position. When this biasing device is activated here, whenever the attachment point 218 is disposed at a point where the torque generated by the weight of the injection head 202 is unequal to the torque generated by the elastic element 216 the injection head 202 will be naturally induced to move into a particular position.

In a more general sense, the beverage preparation machine can in this way be configured so that the injection head can, upon command, be disposed in a position which prevents the formation of deposits and growth of microorganisms therein, and which promotes the clean operation and storage of the machine in a general sense.

Moreover, it should be understood that the first, inactive position does not necessarily denote a position such as depicted in FIGS. 2A and 2B, but rather simply one in which undesirable deposits and/or microorganism growth in the beverage preparation machine are more likely. Likewise, the second, active position is not necessarily that in which the beverage preparation machine is disposed to prepare beverages, though this may be the case.

In fact, it may be advantageous to configure the first, inactive and second, active positions such that the user is conditioned, or at least induced, to remove the spent beverage capsule, ideally immediately after the beverage extraction has completed. For instance, the beverage preparation machine may be configured such that it can only be turned off when it is disposed in the first, inactive position; in this way, the user may be conditioned to remove the beverage capsule prior to turning off and storing the beverage preparation machine between uses.

Also, it should be understood that, depending on the configuration of the beverage preparation machine, it may also be envisioned that the biasing device operates at least in part by declutching or disengaging a portion of the mechanism; indeed, this kind of configuration may be particularly desirable when the beverage preparation machine is at least partially motorized. The person of skill in the art will recognize that a number of different variations may be possible and will be able to implement the one most appropriate to the case in question.

Figure 3A:
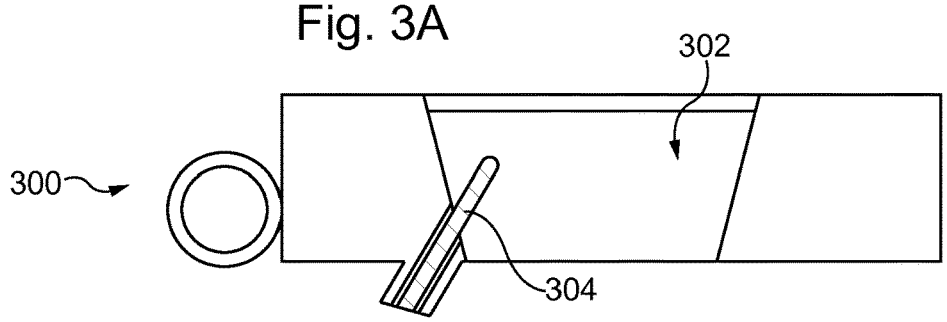
FIGS. 3A and 3B are side section views of a capsule receptacle according to a second embodiment of the invention, respectively without and with a capsule disposed therein.

Turning now to FIG. 3A, a biasing device according to a second embodiment of the invention is depicted. A capsule receptacle 300 comprises a capsule seat 302 into which a beverage capsule may be disposed; once the beverage capsule is seated in the capsule receptacle 300 and the capsule receptacle 300 correctly positioned in the beverage preparation machine, the The capsule receptacle 300 here is of the drawer-type, similar to the capsule receptacle 204 depicted in FIGS. 2A and 2B and known in the art. The capsule receptacle further comprises a spring-loaded blocking pin 304, which is depicted in FIG. 3A in a retracted position. The blocking pin 304 is spring-loaded such that when the capsule receptacle is empty, it will naturally return to a position where it does not protrude from the outer surface of the capsule receptacle 300, instead protruding into the capsule seat 302.

Figure 3B:
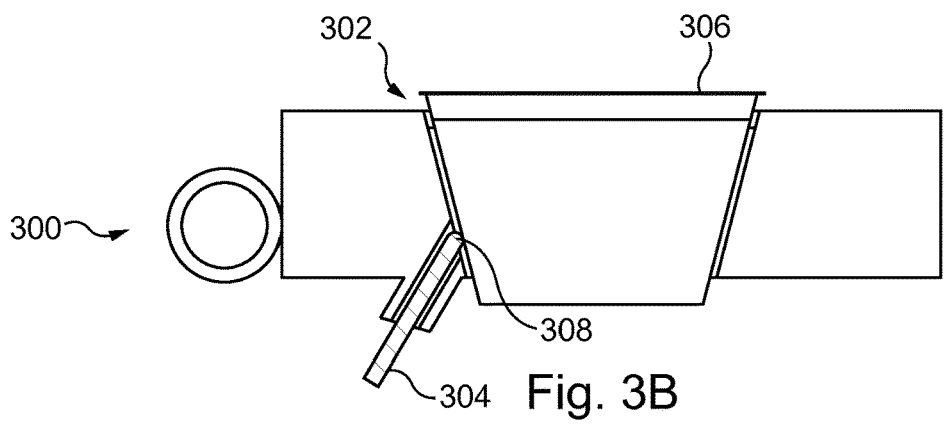

FIG. 3B depicts the capsule receptacle 300 when a beverage capsule 306 is present. An end 308 of the blocking pin 304 bears against the side of the beverage capsule 306, such that as the beverage capsule 306 is inserted into the capsule seat the blocking pin 304 is pushed out into the extended position shown in FIG. 3B.

The blocking pin and the beverage preparation machine can be configured such that so long as there is a beverage capsule in the capsule receptacle, the extended blocking pin will prevent the injection head from being disposed in the first, inactive position by bearing against a complementary surface elsewhere in the beverage preparation machine.

For instance, when used in the beverage preparation machine 200 depicted in FIGS. 2A and 2B, the blocking pin 304 will bear against the container receptacle 206, thereby preventing the injection head 204 from being disposed in the first, inactive position so long as there is a beverage capsule in the capsule receptacle 300. The extension of the blocking pin 304 is therefore a variant biasing method, and the blocking pin 304 thus comprises both a capsule detecting means (specifically its end 308) and a biasing device.

Of course, other configurations for a blocking device such as the blocking pin 304 are possible, and well within the ability of the person of skill in the art to provide in the appropriate form and configuration for the application in question.

Indeed, the blocking pin 304 should be regarded as just one possible embodiment of an interlock which, when engaged, serves the biasing function of the invention as described above.

Figure 4A:
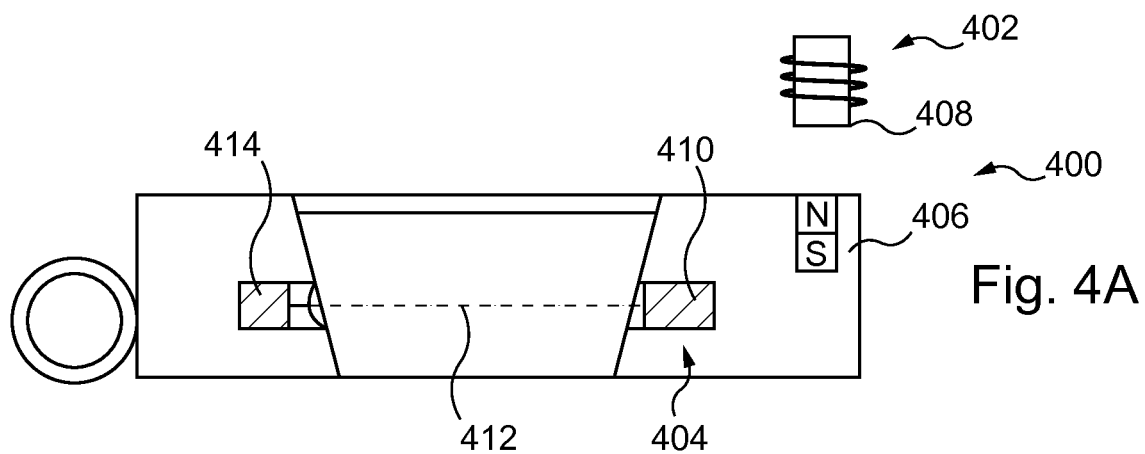
FIGS. 4A and 4B are side section views of a capsule receptacle according to a third and a fourth embodiment of the invention, respectively.
Figure 4B:

The presence of a beverage capsule may be detected by a number of different means, including both electronic and electro-mechanical means. In FIGS. 4A and 4B, a number of possible electronic capsule-detecting means are depicted. In FIG. 4A, a capsule receptacle 400 comprises two capsule-detecting means 402 and 404.

The capsule-detecting means 402 is a system based on the use of magnets. A magnet 406 is disposed in the capsule receptacle 400, and is positioned such that when the capsule receptacle 400 is inserted into the beverage preparation machine, the change in magnetic field will generate a current in a detector coil 408.

This magnetic sensor capsule-detecting means 402 permits a control mechanism in the beverage preparation machine a computer, for instance to monitor changes in the position of the capsule receptacle 400.

For instance, when a change in the position of the capsule receptacle 400 is detected prior to a beverage extraction step (such as the step S110 of FIG. 1), the computer can assume that a beverage capsule has been disposed in the capsule receptacle 400. Once the beverage extraction step has been completed, it may be assumed that if no further change in the position of the capsule receptacle 400 is detected by the capsule-detecting means 402, the beverage capsule is still present and the biasing device should remain active.

The capsule-detecting means 404 can be employed instead of, or in complement with, the capsule-detecting means 402. The capsule-detecting means 404 comprises a light source 410 emitting a beam of light 412 that is captured by a light receiver 412; when there is a capsule present in the capsule receptacle, the beam 412 is blocked and the presence of a beverage capsule can therefore be detected by the beverage preparation machine Similar sensors may be employed in other embodiments: for instance, a set of electrical contacts making and breaking a circuit when a beverage capsule is present or when the capsule receptacle is removed and/or replaced; or an infrared sensor which detects the presence of a warm (and therefore spent) beverage capsule.

FIG. 4B depicts another possible embodiment, comprising a capsule receptacle 416, in which a beverage capsule 418 is disposed. The beverage capsule 418 comprises an RFID tag 420, which is read by a complementary RFID transducer 422 disposed in the beverage preparation machine.

By scanning the RIFD tag 420, the beverage preparation machine is not only provided with information relative to the presence of the beverage capsule (and thus on its insertion and removal from the beverage capsule receptacle 416), but also provided with information on the contents of that capsule that are encoded in the RFID tag 420. In particular, when the information on the RFID tag 420 is unique to the beverage capsule 418, the beverage preparation machine can be configured to activate the biasing device and thereby avoid a second use of a spent beverage capsule. In this way, contamination of the apparatus may be avoided, while ensuring a consistently high quality of beverages produced.

Figure 5:
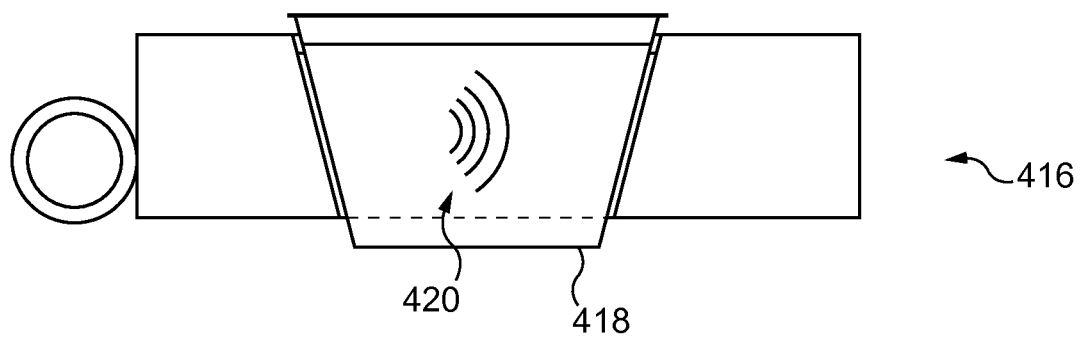
FIG. 5 is a side section view of a capsule receptacle according to a fifth embodiment of the invention.
Figure 5:
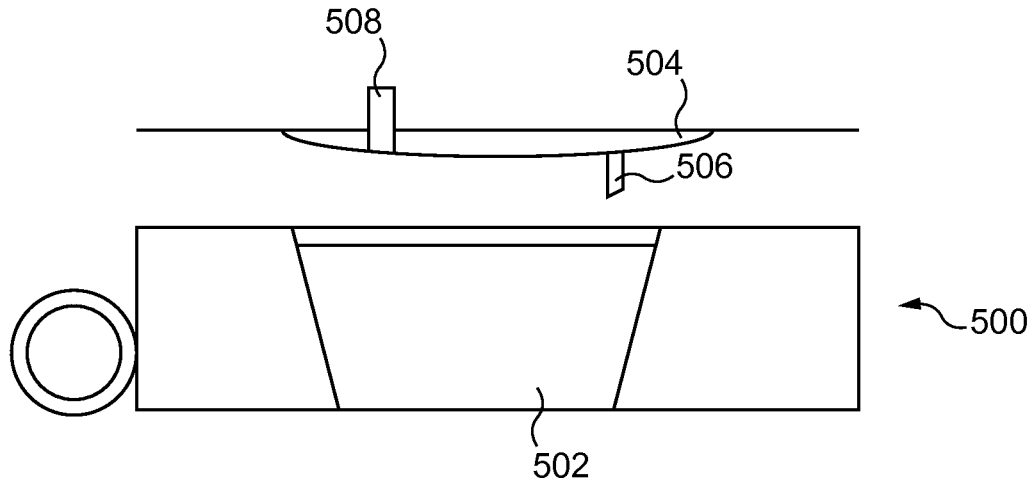

Alternatively, more direct, electro-mechanical means may be used, such as switches or pressure sensors, to detect the presence of a beverage capsule within the capsule receptacle. FIG. 5 depicts one such embodiment. A capsule receptacle 500, comprising a capsule seat 502 is configured to cooperate with an injection plate 504 disposed within the beverage preparation machine.

The injection plate 504 comprises an injection needle 506 through which the fluid is injected into the capsule. When the capsule receptacle 500 is loaded into the beverage preparation machine, the injection plate 504 is pressed into the capsule receptacle 500 and into the lid of a beverage capsule present in the capsule seat 502.

In this embodiment, the injection plate 504 comprises a pressure sensor 508, aligned to be coincident with the capsule seat 502. When there is no beverage capsule in the capsule receptacle 500, the capsule seat 502 is empty and, when the injection plate 504 is pressed against the capsule receptacle 500 will return no signal. Conversely, when a beverage capsule is present, the signal will be returned by the pressure sensor 508, indicating the presence of the beverage capsule.

It will be noted that electromechanical means for detecting the presence of a capsule need not necessarily mean a pressure sensor in the injection plate, as depicted in FIG. 5. Rather, it may be that there is provided a means for detecting linear forces, torsional forces, and/or torques present in the beverage preparation machine that are indicative of the presence of a beverage capsule.

Indeed, variations on and combinations of any or all of the capsule-detection means described above, and/or other means such as appropriate, may be considered by the person of skill in the art, and should be considered as falling within the scope of this invention.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. An apparatus for preparing beverages, the apparatus comprising:
a capsule receptacle adapted to receive a beverage capsule containing a quantity of a beverage ingredient;
an injection head adapted to inject a volume of a fluid into the beverage capsule to produce a beverage, the injection head being mobile between a first, inactive position and a second, active position;
a biasing device configured to selectively prevent the injection head from remaining in the first, inactive position; and
a capsule-detecting member adapted to activate the biasing device when the capsule-detecting member detects the presence of the beverage capsule within the capsule receptacle,
wherein the biasing device is adapted to selectively bias the injection head into either the second, active position when the capsule-detecting member detects the presence of the beverage capsule; and into the first, inactive position when the capsule-detecting member detects the absence of the beverage capsule.

2. The apparatus according to claim 1, wherein the biasing device comprises a resilient element being operably connected to the injection head at an attachment point, the attachment point being mobile between (1) a first attachment position wherein the force exerted by the mass of the injection head is greater than the force exerted by the resilient element, thereby biasing the injection head into the first, inactive position; and (2) a second attachment position wherein the force exerted by the resilient element is greater than the force exerted by the mass of the injection head, thereby biasing the injection head into the second, active position.

3. The apparatus according to claim 2, wherein the resilient element is selected from the group consisting of an elastic polymer linkage, a metallic spring, a gas strut, and combinations thereof.

4. The apparatus according to claim 1, wherein the capsule-detecting member is an electrical or electro-mechanical sensor.

5. The apparatus according to claim 1, wherein the capsule-detecting member is selected from the group consisting of a magnetic sensor, an optical sensor, a proximity sensor, a radio-frequency sensor, and combinations thereof.

6. The apparatus according to claim 1, wherein the capsule-detecting member is a pressure sensor located in the capsule receptacle or the injection head.

7. An apparatus for preparing beverages, the apparatus comprising:
a capsule receptacle adapted to receive a beverage capsule containing a quantity of a beverage ingredient;
an injection head adapted to inject a volume of a fluid into the beverage capsule to produce a beverage, the injection head being mobile between a first, inactive position and a second, active position;

a biasing device configured to selectively prevent the injection head from remaining in the first, inactive position; and a capsule-detecting member adapted to activate the biasing device when the capsule-detecting member detects the presence of the beverage capsule within the capsule receptacle, wherein the biasing device comprises an interlock preventing the disposition of the injection head into the first, inactive position, the interlock is a blocking pin, the blocking pin being mobile between a first, retracted position and a second, extended position wherein the blocking pin bears against a complementary surface of the apparatus, thereby preventing the disposition of the injection head into the first, inactive position, and the blocking pin is located at least partially within the capsule receptacle when disposed in the first, retracted position, such that the insertion of the beverage capsule into the capsule receptacle will cause the blocking pin to move into the second, extended position.

8. The apparatus according to claim 7, wherein the capsule-detecting member is an electrical or electro-mechanical sensor.

9. The apparatus according to claim 7, wherein the capsule-detecting member is selected from the group consisting of a magnetic sensor, an optical sensor, a proximity sensor, a radio-frequency sensor, and combinations thereof.

10. The apparatus according to claim 7, wherein the capsule-detecting member is a pressure sensor located in the capsule receptacle or the injection head.

11. A method for preparing a beverage using an apparatus, the method comprising:

detecting the presence of a beverage capsule in a capsule receptacle, the beverage capsule containing a quantity of a beverage ingredient;

activating a biasing device to prevent an injection head from remaining in a first, inactive position;

injecting a volume of water into the beverage capsule to produce the beverage;

detecting the absence of the beverage capsule in the capsule receptacle; and deactivating the biasing device.

12. The method according to claim 11, wherein the activating of the biasing device comprises a blocking sub-step wherein the injection head is prevented from being disposed into the first, inactive position.

13. The method according to claim 12, wherein the blocking sub-step comprises engaging an interlock.

14. The method according to claim 11, wherein the detecting of the presence of the beverage capsule and the detecting of the absence of the beverage capsule are performed by a capsule-detecting member located in the injection head or the capsule receptacle.

* * * * *